Figure 1:
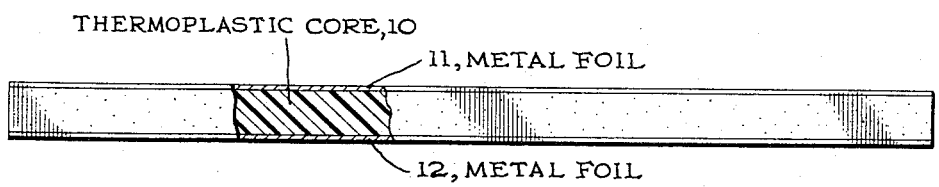

May 7, 1968     T. E. BUGEL ET AL     3,382,136

MOLDABLE LAMINATES OF METAL AND PLASTICS

Filed Jan. 8, 1962

INVENTORS
THOMAS E. BUGEL
WILLIAM H. JOYCE

BY *James C. Arrantes*

ATTORNEY

United States Patent Office 3,382,136
Patented May 7, 1968

3,382,136
MOLDABLE LAMINATES OF METAL
AND PLASTICS
Thomas E. Bugel, Roselle, and William H. Joyce, Somerset, N.J., assignors to Union Carbide Corporation, a corporation of New York
Filed Jan. 8, 1962, Ser. No. 164,740
5 Claims. (Cl. 161—165)

This invention relates to inelastic composite laminates. More particularly, this invention relates to composite laminates of metal and plastic that are inelastic and are characterized by excellent stiffness and toughness, excellent weathering resistance, excellent cold-forming qualities, improved sound deadening properties, excellent flame resistance, relatively low thermal conductivity and excellent thermal stability.

Many thermoplastics, notably polyethylene and polystyrene, have been found to have good stiffness and toughness at room temperature and to exhibit excellent corrosion resistance, low thermal conductivity and good sound deadening properties. These properties would appear to render such thermoplastics particularly desirable as a material from which to fabricate such structures as roof flashings, gutters and heating and cooling ducts. Furthermore, the adaptation of thermoplastics to structural uses would appear to have particular attractiveness as structures fabricated therefrom exhibit improved properties, for instance, better thermal and sound insulation and lighter weight, over similar structures made from metals such as copper and aluminum.

However, these and other similar structures are generally not of a standard size but are formed on the job site in order to meet the varied dimensional requirements of the work. Any material from which these structures are fabricated, therefore, should have the ability to be cold formed on the job site either by hand or with relatively simple tools such as pliers and the like.

It is known that flexible thermoplastics, such as polyethylene, completely lack the ability to be cold formed into permanently shaped structures because their inherent elasticity tends to return a shaped article fabricated therefrom to its original form almost immediately.

For purposes of demonstrating the elastic qualities of flexible thermoplastics, a polyethylene sheet, produced by melt-extruding polyethylene having a density of 0.92 gram/cc. at 23° C. into a sheet 8 inches by 8 inches by 0.125 inch thick was bent around a one-inch mandrel into a 180 degree U-bend. The sheet returned almost immediately to its original shape.

Rigid thermoplastics, that is thermoplastics having a tensile modulus in excess of about 100,000 p.s.i. at 23° C. as determined by the procedure described in ASTM text D–882–TC, are further restricted in their use as a material from which structural elements are fabricated on the job site, because of their brittle nature. Any attempt to cold form polystyrene, for example, results in cracking and breaking of the polystyrene.

Up until the present time, in order to form thermoplastics into permanently shaped structures, it has been necessary to use rather massive stamping equipment, extruder, contour dies, molds and the like and a means for heating the thermoplastic to elevated temperatures, at which temperatures the thermoplastics are sufficiently soft to be shaped by apparatus previously noted.

The necessity of using rather massive equipment for purposes of forming thermoplastics into permanently shaped structures has precluded their use as a material from which to fabricate structures on the job site.

It has now been found that difficulties connected with adapting thermoplastics to on the job structural uses can be unexpectedly overcome by laminating both sides of a relatively thick thermoplastic core with relatively thin metal foil.

The composite laminates of this invention comprise a thermoplastic core of from about 0.005 inch to about 1.4 inches thick having laminated to both surfaces thereof metal foil of from about 0.00025 inch to about 0.01 inch thick. Particularly desirable composite laminates are those comprising a thermoplastic core of from about 0.025 inch to about 0.075 inch thick having laminated to both surfaces thereof a metal foil of from about 0.001 inch to about 0.005 inch thick. It is also to be understood, for reasons that will be given subsequently, that the thermoplastic core has a thickness greater than the combined thickness of the metal foil laminae, and that the metal foil laminae have a yield strength in tension and a yield strength in compression, the sum of which is greater than the sum of the yield strength in tension and the yield strength in compression of the thermoplastic core, but less than the shear strength of the metal-thermoplastic interfaces and less than the shear strength of the thermoplastic core itself.

Figure 2:
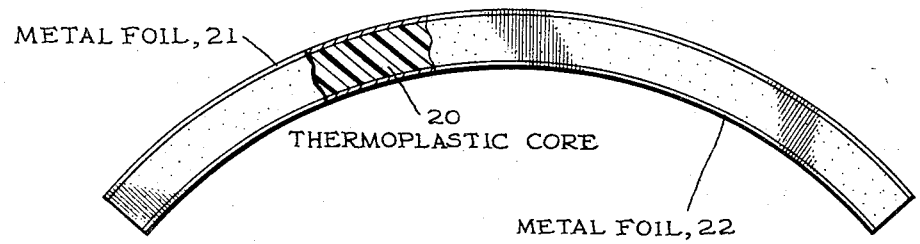

The present invention will be further understood by reference to the accompanying drawing wherein:

FIGURE 1 is a side view in elevation, partially in section, of one embodiment of a composite laminate of this invention; and FIGURE 2 is a side view in elevation, partially in section, of one embodiment of a shaped composite laminate of this invention.

In FIGURE 1, the composite laminate is shown to include a thermoplastic core 10 laminated on both surfaces with metal foils 11 and 12.

FIGURE 2 shows, by way of illustration, a shaped composite laminate comprising a thermoplastic core 20 laminated on both surfaces with metal foils 21 and 22, metal foil 21 being under tension and metal foil 22 being under compression.

The composite laminates of this invention are light, flexible, inelastic (have an inelastic ratio as high as 100 percent as will be described subsequently) and are self-supporting. The composite laminates have greatly improved stiffness and toughness at room temperature, about 23° C., over the thermoplastic alone, exhibit excellent resistance to weathering and are ready cold-formable at ambient temperatures into permanently shaped structures, on the job site, by hand or by the use of simple tools. The composite laminates of this invention are further characterized by improved moldability, that is, they permit a truer reproduction of a forming member such as an embossing die.

For example, composite laminates of this invention can be cold-formed into intricate shapes having clearly defined lines by embossing or cold-drawing without undergoing any delamination or fracture of the foil. In addition, the composite laminates of this invention can be cold-formed using sheet stock which is thicker than the forming die clearance, with the result that the shaped article is free of wrinkles and undergoes a minimum of dimensional and contour aberrations.

These composite laminates are also characterized by low thermal conductivity which renders such laminates especially desirable for use as heating and cooling ducts.

In addition, the composite laminates are further characterized by excellent sound deadening properties. Heating or cooling ducts fabricated from composite laminates of this invention will not transmit vibrations from a blower, which blows air through the ducts, to the same extent as does a metal duct.

In addition, by laminating both surfaces of a core, formed from a brittle thermoplastic, with metal foil, in accordance with the present invention, results in a laminate that can be cold-formed whereas the same thermoplastic, without any metal foil laminated thereto, will fracture when subjected to the same amount of stress. This is shown by the following data: to both surfaces of a polystyrene sheet having a thickness of 0.019 inch there was laminated aluminum foil which had a thickness of 0.005 inch. The process by which the metal foil was laminated to the polystyrene sheet is described in detail in Example 1 of this application. The composite laminate was bent 5 times through 90 degrees without having the polystyrene core crack. Attempted bending of a polystyrene sheet of the same thickness, i.e. 0.019 inch, through a 90 degree band resulted in a fracture of the sheet.

Also, the composite laminates of this invention exhibit improved flame resistance over thermoplastic alone. As an illustration, a composite laminate was formed by laminating to both surfaces of a polyethylene sheet, having a thickness of 0.125 inch, aluminum foil, which had a thickness of 0.005 inch. The process by which the metal foil was laminated to the polyethylene sheet is described in detail in Example 1 of this application. The composite laminate was held in direct contact with the flame from a Bunsen burner (1700° C.) for one-half minute without burning. A polyethylene sheet when placed in the same flame burst into flames immediately.

As an additional feature, the composite laminates of this invention exhibit excellent stability at elevated temperatures. This feature is illustrated by the data which follows. To both surfaces of a polyethylene sheet having a thickness of 0.125 inch, there was laminated aluminum foil which had a thickness of 0.005 inch. The process by which the metal foil was laminated to the polyethylene sheet is described in detail in Example 1 of this application. The composite laminate was cold-formed by hand into a 180 degree U-bend and placed in an oven which was at a temperature of 113° C., for 60 minutes. The article did not change its dimension nor did it relax its bend. A sheet of polyethylene having a thickness of 0.125 inch was also placed in an oven, which was at a temperature of 113° C., for 15 minutes. The sheet became soft, rubbery, tacky and lost its original shape.

As pointed out previously, the metal laminae of the composite laminates of this invention must have a yield strength in tension and a yield strength in compression, the sum of which is greater than the sum of the yield strength in tension and the yield strength in compression of the thermoplastic core, but less than the shear strength of the metal plastic interfaces and less than shear strength of the thermoplastic core itself. A complete definition of these terms and test procedures used to evaluate these strengths are contained in the following:

| | ASTM |
|---|---|
| Shear strength of metal-thermoplastic interfaces | C273–53. |
| Yield strength in tension of thermoplastics | D638–60T. |
| Yield strength in compression of thermoplastics | D695–54. |
| Shear strength of plastics | D732–46. |
| Definitions of strength terms | E6–60T. |
| Yield strength in tension of metals | E8–57T. |
| Yield strength in compression of metals | E9–59T. |

Stated in different terms, the metal laminae must possess sufficient strength to overcome the inherent elasticity of the thermoplastic core. This in effect renders the composite laminates of this invention cold-formable. But, at the same time this strength of the metal laminae must be less than the bond strength in shear of the metal-thermoplastic interfaces and less than the shear strength of the thermoplastic core. If the strength of the metal laminae is greater than either of these strengths of the interfaces or the core, the composite laminate will fail in shear at the interfaces or the core itself will rupture upon cold-forming.

In order to point out the novel features of this invention and to establish the criticality of the thickness requirements of the various lamina of the composite laminates of this invention, the following comparisons and evaluations were made.

A metal sheet material of comparable thickness differs from the composite laminates of this invention in that the metal sheet material does not possess any of the desirable properties of the composite laminates, e.g., metal is not a good thermal and sound insulation, has considerable elasticity as shown by the data appearing in the table of Example 1, is heavier and requires considerably more force in order to be cold-formed.

A thermoplastic sheet of comparable thickness to a composite laminate of this invention also differs in that it is considerably less stiff and tough, completely lacks the ability to be cold-formed (as shown in Example 1, Specimen 6) is not resistant to flame and is not thermally stable.

A composite laminate comprising a thermoplastic sheet laminated on one side with a metal foil also does not have the properties of the composite laminates of this invention, i.e., it is less stiff, and behaves substantially the same as thermoplastic sheet with respect to inability to be cold-formed (as shown in Example 1, Specimen 7), and has poor thermal stability and flame resistance.

A composite laminate having outer foil laminae of a thickness less than that prescribed by this invention, that is, less than about 0.00025 inch, will not exhibit the same properties as a composite laminate of this invention. Such a composite laminate cannot be cold-formed, but will remain substantially elastic much as the thermoplastic core itself. Here the metal foil laminae does not have sufficient strength to overcome the inherent elasticity of the thermoplastic core and render the composite laminate cold-formable.

A composite laminate having a thermoplastic core thinner than prescribed by this invention, that is, less than about 0.005 inch, will also show a degradation in properties. Such a composite will lack any of the desirable properties of the thermoplastic, such as thermal and sound insulation, and will have substantially the same properties as the metal foil. A similar result obtains when the thickness of the thermoplastic core is less than the combined thickness of the metal laminae, that is, such a composite will have substantially the same properties as the metal itself, and would require considerably more force to be cold-formed than the composite laminates of this invention.

A composite laminate having metal laminae thicker than that prescribed by this invention, that is, greater than about 0.01 inch, will not behave in the same manner as the composite laminates of this invention. Any attempt to cold-form such a composite laminate will ordinarily result in delamination and buckling at the interfaces or failure of the core itself. Here the yield strength in compression and tension of the metal laminae is greater than the shear strength of the interfaces, or the shear strength of the core, and accounts for the failure. Further, if such a composite did not fail, considerable difficulty would be encountered in cold-forming. That is, a far greater degree of force would be required to cold-form such a composite than is required to cold-form the composites of this invention. In addition, such a composite laminate would not have good thermal insulating properties, and would be considerably heavier and consequently more difficult to handle than the composite laminates of this invention.

A composite laminate having a thermoplastic core greater in thickness than that prescribed by this invention, that is, about 1.4 inches, will also show a degradation in properties. Such a composite could not be cold-formed in the manner of this invention, but would be considerably elastic much as the thermoplastic core alone. Such a composite would also show a degradation in thermal stability. Here the yield strength in compression and tension of the thermoplastic core exceeds the yield strength in compression and tension of the metal laminae, and accounts for the inability of such a composite laminate to be cold-formed.

The composite laminates of this invention can be prepared in any convenient manner as is known to those skilled in the art. Besides the method detailed in Example 1, the composite laminates of this invention can be prepared in compression molding presses, by an extrusion coating process, a calendering process and other such processes. If desired, the thermoplastic core can be secured to the metal foil using adhesives as for example, epoxide resins and the like, and the metal foil can be coated by suitable means with a thin film (e.g., about 0.005 inch) of thermoplastic prior to lamination to a core of the same or a different thermoplastic. In addition, the metal foil lamina can be coated by suitable means, for instance by extrusion coating, with a thermoplastic to a thickness equal to one-half of the core thickness desired, and the composite laminate can be formed by laminating the two halves together. The surface or surfaces of the thermoplastic core material and/or the metal foil can be pretreated mechanically, chemically, thermally, and electrically to improve bonding. The width and length of the composite laminates can be as desired and will also depend upon their ultimate end use.

Any metal foil can be used for purposes of this invention. Exemplary of suitable metal foils are those made from aluminum, copper, steel, brass and the like, with aluminum being preferred. As an example of the use of a metal foil other than the aforementioned aluminum, copper foil 0.01 inch thick was pre-coated with a 0.005 inch film of polyethylene using a 1¼ inch extruder having a 26 inch die and was laminated to both sides of a polyethylene core 0.075 inch thick. The process by which the pre-coated metal foil was laminated to the polyethylene core is described in detail in Example 1 of this application. The resultant composite laminate was readily cold-formable and possessed all of the properties of a composite laminate of this invention. The particular metal foil used in any given application will depend upon the end use of the resultant composite laminate. It is to be understood that the metal laminae of a given composite laminate can be of the same metal or of different metals, and each of the metal lamina can be of the same or different thickness.

Illustrative of suitable thermoplastics which can be used in this invention are the following: olefinic thermoplastic polymers such as polyethylene, polypropylene, copolymers and terpolymers thereof, as for example, copolymers of ethylene and ethyl acrylate; polyamides; polyhydroxyethers, that is, thermoplastics containing the following repeating unit:

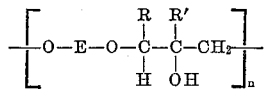

wherein E is the nucleus of a dihydric polynuclear phenol and R and R′ are either hydrogen or methyl; polycarbonates, that is, thermoplastics containing the following repeating unit:

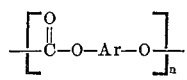

wherein Ar is the residue of an aromatic dihydric phenol; thermoplastic vinyl polymers formed from one or more of the following monomers; vinyl aryls such as styrene, o-methoxystyrene, p-methoxystyrene, m-methoxystyrene, o-nitrostyrene, m-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-diethyl-methacrylamide methacrylamide, N-methyl methacrylamide, N,N-dimethyl methacrylamide, acrylonitrile, chloroacrylonitrile, methacrylonitrile, ethacrylonitrile and the like; alkyl esters of maleic and fumaric acid such as dimethyl maleate diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate and the like. The preferred thermoplastic to be used with this invention is polyethylene, and, if desired, foamed thermoplastic materials of any of the above-mentioned polymers can be used for the core of the composite laminates of this invention. The particular thermoplastic core used in any given application will depend upon the end use of the resultant composite laminate. It is to be understood that the thermoplastics to be used with this invention can contain various additives as is well-known in the art, as for example dyes, pigments such as titanium dioxide, stabilizers, lubricants, antioxidants such as 4,4′-thio-bis-(3-methyl-6-tert-butylphenol), fillers such as carbon black, talc, clay and the like, and cross-linking agents such as bis-($\alpha$,$\alpha$-dimethyl benzyl)peroxide.

The following examples further illustrate the present invention and are not intended to limit the scope thereof in any manner.

Example I

This example illustrates the inelastic properties of the composite laminates of this invention as compared to other laminates and sheet material.

(a) Preparation of the composite laminates.—A 3½ inch Prodex extruder having a sheet die of 26 inches wide was used to extrude hot polyethylene, at a stock temperature of 400° C., having a density of 0.92 gram per cc. at 23° C., into the nip of cooperating pressure rolls of a Robbins Sheet take-off. Aluminum foil was simultaneously fed on both sides of the hot extruded polyethylene at the nip of the cooperating pressure rolls. The aluminum foil was pressed into intimate contact with the hot polyethylene and became bonded thereto forming a composite self-sustaining laminate on passing through the cooperating pressure rolls. Test specimens 1 inch wide, 5 inches long, and having a thickness noted in the table which follows were cut from the composite laminates. Thickness of the extruded polyethylene and the thickness of the metal foil, after being laminated are also noted in the aforementioned table.

(b) Preparation of polyethylene sheets.—A 3½ inch Prodex extruder having a sheet die of 26 inches was also used to hot extrude sheets from polyethylene, having a density of 0.92 gram per cc. at 23° C., from which were cut test specimens 1 inch wide, 5 inches long and having a thickness as noted in the table below.

(c) The sheet of aluminum foil tested was 1 inch wide, 5 inches long with the thickness thereof as indicated in the table.

Each test specimen was bent using the equipment and test procedure described in ASTM D790–59T (Procedure B). The deflections are indicated by imposed deflection in inches in the table. The bent specimens were measured after one week to determine retained deflection. These values are listed in the table. An "inelastic" ratio was computed by dividing the retained deflection by the imposed deflection.

Test specimens 1 through 4, noted in the table which follows, were made of polyethylene with aluminum foil laminated to both surfaces thereof.

Test specimen 5 was solely aluminum foil.

Test specimen 6 was solely polyethylene.

Test specimen 7 was polyethylene having aluminum foil laminated to one side thereof.

The test results, as indicated in the table, clearly show the inelastic properties of the composite laminates of this invention, e.g., an inelastic ratio of about 95 to 100 percent, as compared to aluminum sheet (81 percent), polyethylene (0 percent), and polyethylene sheet with aluminum laminated to one side (0 percent).

| Test Specimens | Thickness in Inches | | | Deflection, In. | Modulus of Rigidity p.s.i.×10⁶ |
|---|---|---|---|---|---|
| | Polyethylene | Aluminum | Laminate | | |
| 8 | 0.021 | 0.002 | 0.025 | 0.455 | 6.73 |
| 9 | 0.042 | 0.002 | 0.046 | 0.246 | 3.80 |
| 10 | 0.064 | 0.002 | 0.068 | 0.150 | 2.55 |
| 11 | 0.109 | 0.002 | 0.113 | 0.070 | 2.05 |
| 12 | | 0.040 | | | 10.0 |

Test specimens 8–11 were made of polyethylene with aluminum foil laminated to both surfaces thereof. The thickness of the polyethylene and the thickness of the aluminum foil laminated to each surface of the polyethylene is noted in the table above. The values for modulus of rigidity of the aluminum laminae as a function of laminate thickness shown in the table noted above were calculated assuming that the total stiffness of the laminate is attributed to the aluminum laminae, and that no stiffness is contributed by the polyethylene core. The modulus of rigidity values in the table indicate that the rigidity of the laminate falls off rapidly as the core thickness increased. This result is totally unpredictable since the expected modulus of rigidity values would be either 10×10⁶ p.s.i., which is the modulus of rigidity of aluminum irregardless of thickness; or they would be expected to be greater if the modulus of rigidity of polyethylene were included in the calculations. Therefore the results of this test clearly indicate that the force required to cold-form

| Test Specimen | Thickness in Inches | | | Imposed Deflection, In. | Retained Deflection, In. | Inelastic Ratio, Percent |
|---|---|---|---|---|---|---|
| | Polyethylene | Aluminum | Laminate | | | |
| 1 | 0.041 | 0.001 | 0.043 | 0.228 | 0.228 | 100 |
| 2 | 0.042 | 0.002 | 0.046 | 0.200 | 0.191 | 95 |
| 3 | 0.064 | 0.002 | 0.068 | 0.234 | 0.232 | 99 |
| 4 | 0.040 | 0.005 | 0.050 | 0.249 | 0.245 | 98 |
| 5 | | 0.040 | | 0.123 | 0.100 | 81 |
| 6 | 0.064 | | | 0.234 | 0.000 | 0 |
| 7 | 0.064 | 0.002 | 0.066 | 0.234 | 0.000 | 0 |

Example II

This example illustrates the readiness with which the composite laminates of this invention can be cold-formed.

Specimens used in this example were prepared as in Example I, and were used to obtain deflection data according to test procedure ASTM D790–58T. The deflection data shown in the table are the deflections in inches for a ten pound load and were obtained from load deflection diagrams drawn according to ASTM test procedure referred to previously.

This data was then used to calculate the modulus of rigidity values in p.s.i.×10⁶ shown in the table below. These values were calculated using the following formulae:

$$E = \frac{PL^3}{48I\delta}$$

where $$I = 2\left[\frac{bh^3}{12} + Ax^2\right]$$

and where:

$E$ = the modulus of rigidity, in p.s.i.
$P$ = applied load, in pounds
$L$ = test span, in inches
$I$ = moment of inertia
$\delta$ = deflection for load P, in inches
$b$ = width of the specimen, in inches
$h$ = thickness of the foil, in inches
$A = bh$
$x$ = the distance from the center of the foil to the center of the laminate the laminates of this invention is unexpectedly less than would be predictable using standard measuring means and formulae.

What is claimed is:

1. A self-supporting, cold-formable inelastic composite laminate capable of being cold-formed at ambient temperatures into permanently shaped structures comprising a thermoplastic polymeric sheet-like core of from about 0.005 inch to about 1.4 inches thick, said core having uniformly bonded to both surfaces thereof a metal foil of from about 0.00025 inch to about 0.01 inch thick, wherein said thermoplastic core has a thickness greater than the combined thickness of the metal foil laminae, and wherein the sum of the yield strength in tension and the yield strength in compression of the said metal foil laminae is greater than the sum of the yield strength in tension and the yield strength in compression of said thermoplastic core, but less than the shear strength of the metal-thermoplastic interfaces of said composite laminate, and less than the shear strength of said thermoplastic core.

2. A composite laminate as defined in claim 1 wherein said thermoplastic core is polyethylene.

3. A composite laminate as defined in claim 1 wherein said thermoplastic core is polystyrene.

4. A composite laminate as defined in claim 1 wherein said metal foil is aluminum.

5. A composite laminate as defined in claim 1 wherein said thermoplastic core has a thickness of from about 0.025 inch to about 0.075 inch and said metal foil has a thickness of from about 0.001 inch to about 0.005 inch.

(References on following page)

References Cited

UNITED STATES PATENTS

| | | | |
|---|---|---|---|
| 1,983,520 | 12/1934 | Charch et al. | |
| 2,830,001 | 4/1958 | Barnes et al. | 130—50 |
| 2,954,912 | 10/1960 | Kauffeld | 229—3.5 |
| 2,982,457 | 5/1961 | D'Alelio | 229—3.5 |
| 3,067,569 | 12/1962 | Kelley | 161—216 |

ROBERT F. BURNETT, *Primary Examiner.*

ALEXANDER WYMAN, EARL M. BERGERT,
*Examiners.*

R. J. ROCHE, *Assistant Examiner.*